(12) United States Patent
Wichern

(10) Patent No.: US 8,594,559 B2
(45) Date of Patent: Nov. 26, 2013

(54) COMBINED SATELLITE RADIO RECEIVER

(75) Inventor: Andreas Hans Walter Wichern, Hamburg (DE)

(73) Assignee: NXP, B.V., Eindhoven (NL)

( * ) Notice: Subject to any disclaimer, the term of this patent is extended or adjusted under 35 U.S.C. 154(b) by 583 days.

(21) Appl. No.: 12/895,363

(22) Filed: Sep. 30, 2010

(65) Prior Publication Data
US 2012/0082275 A1   Apr. 5, 2012

(51) Int. Cl.
*H04H 20/74*   (2008.01)
*H04K 3/00*   (2006.01)

(52) U.S. Cl.
USPC .......... 455/3.02; 370/208; 370/319; 370/321; 370/337; 370/344; 370/347

(58) Field of Classification Search
USPC ......... 455/3.02; 370/208, 319, 321, 337, 344, 370/347; 714/784
See application file for complete search history.

(56) References Cited

U.S. PATENT DOCUMENTS

| | | | |
|---|---|---|---|
| 6,735,416 B1 | 5/2004 | Marko et al. | |
| 7,742,750 B2 * | 6/2010 | Scarpa et al. | 455/273 |
| 8,260,192 B2 * | 9/2012 | Scarpa et al. | 455/3.02 |
| 2006/0264191 A1 * | 11/2006 | Lai | 455/127.2 |
| 2007/0053450 A1 * | 3/2007 | Walker et al. | 375/260 |
| 2012/0014264 A1 * | 1/2012 | Wang | 370/252 |

* cited by examiner

*Primary Examiner* — Bobbak Safaipour

(57) ABSTRACT

A satellite digital radio receiver for receiving first and second radio services. The first and second radio services are broadcast in first and second respective different radio frequency bands. At least one radio programme is broadcast substantially simultaneously on both radio services and one of the frequency bands can produce interference in the other frequency band.

15 Claims, 5 Drawing Sheets

COMBINED SATELLITE RADIO RECEIVER

This invention relates to a receiver for satellite digital radio services. In particular, it relates to an improved or simplified receiver, capable of receiving two or more radio services.

Satellite digital radio is a digital radio service which uses a transmitter on an orbiting communications satellite to deliver radio services to terrestrial receivers. In North America, Satellite radio uses the 2.3 GHz S-band. In other areas, the service shares the 1.4 GHz L-band with terrestrial Digital Audio Broadcasting (DAB) stations. In Europe, it is anticipated that the 2.2 GHz frequency range will be used. The direct-broadcast satellite signal is strong enough to be received without a satellite dish. Compared to terrestrial digital radio services, satellite radio provides the advantages of wide geographical coverage with a very small number of transmitters. Typically, a whole continent can be covered with two or three orbiting satellites.

In urban areas, however, satellite visibility may be limited. To avoid signal dropout in such locations, terrestrial repeaters may be used. These re-broadcast the signal transmitted by the satellite (or satellites).

In the USA, satellite digital radio is known as Satellite Digital Audio Radio Service (SDARS). Historically, there were two independent SDARS radio services: "XM radio" and "Sirius" (formerly "CD Radio"). More recently, these companies have merged; however, to enable backward compatibility with older receivers, both of the separate services have been kept in operation.

Receivers for the US-based SDARS satellite radio service have to fulfil very stringent frequency-selectivity requirements, because the two operator frequency bands (XM and Sirius) are located directly side-by-side in the 2.3 GHz band. In each case, apart from the low-level satellite signal they include potentially very strong terrestrial repeater signals. Due typically to nonlinearities in the receiver, these latter signals would (if they were not filtered out) produce unwanted frequency products of large amplitude, which could make demodulation of the other operator's satellite signal impossible. That is, the terrestrial repeater of one service would interfere, for example by means of Inter-Modulation Distortion (IMD), with the satellite broadcast of the other service. Apart from non-linearity at the receiver, other mechanisms, such as phase noise, could also cause the signals to interfere. This would potentially prevent reception of the satellite broadcast. Costly RF filtering arrangements are needed to ensure satisfactory performance under these circumstances; and these filtering circuits consume both significant physical space in the device and additional electrical power. By way of example, U.S. Pat. No. 6,735,416 discloses a receiver architecture for receiving a single SDARS service, which follows this approach using RF-selectivity.

BRIEF DESCRIPTION OF THE DRAWINGS

The invention will now be described by way of example with reference to the accompanying drawings, in which.

DETAILED DESCRIPTION

Figure 1:
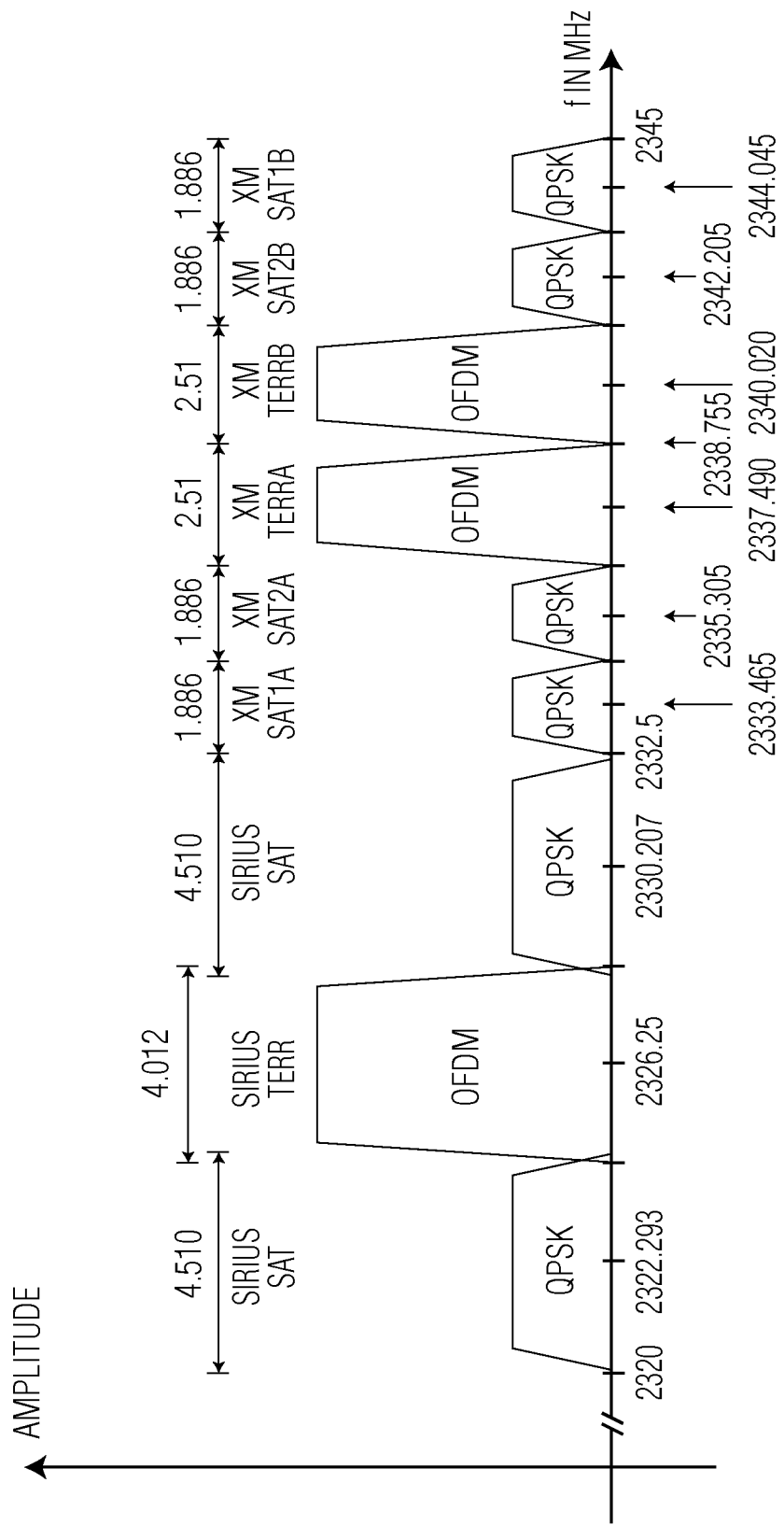
FIG. 1 illustrates the frequency spectrum of the SDARS system in the USA.

According to an aspect of the invention, there is provided a satellite digital radio receiver for receiving first and second radio services, broadcast in first and second respective different radio frequency bands, wherein at least one radio programme is broadcast substantially simultaneously on both radio services, and wherein spectral re-growth or other spectral leakage can cause one of the radio services to interfere with the other radio service, the receiver comprising:

a shared mixer circuit, configured to receive and down-convert signals in a bandwidth comprising both of the frequency bands to signals of lower frequency;

a first processing circuit, coupled to the output of the mixer circuit and configured to demodulate the first radio service;

a second processing circuit, coupled to the output of the mixer circuit and configured to demodulate the second radio service; and a control circuit, connected to the first and second processing circuit and adapted to selectively couple the output of either the first or the second processing circuit to an output of the receiver, wherein when interference in the first frequency band, caused by the second radio service, interferes with demodulation of the first radio service by the first processing circuit, the control circuit couples the output of the second processing circuit to the output, whereby the at least one radio programme can be received from the second radio service.

One source of spectral leakage between frequency bands is spectral re-growth, which occurs when non-linear processing of one of the frequency bands produces Inter-Modulation Distortion, IMD, in the other frequency band. The non-linearity may be of almost any kind—such as a gain curve which deviates slightly from a true linear response; the occurrence of clipping, due to saturation of one of the amplifier components; or reciprocal mixing. Here, IMD refers to any product of two or more frequency components (including the product of a frequency component with itself), which produces a resulting component at a frequency having the general form: (a*f1+b*f2+c*f3+ . . . ), where a, b, and c are positive or negative integers.

Sets of radio programmes (or "channels") broadcast by different satellite radio services will often overlap to some extent, even though they are different services transmitted by different providers. That is, at least some of the radio programmes will be broadcast concurrently by both services. This is certainly the case following the merger of Sirius and XM Radio in the USA. There is a high degree of overlap among the programmes broadcast on these two services; nevertheless, the services remain distinct and both will remain on-air. Furthermore, the programmes that are transmitted jointly on both services tend to be the most popular ones; this increases even more the probability that a given channel being listened to by a user is also available on the other service.

The receiver in accordance with the invention exploits this recognition by providing a relatively low cost receiver, which is able to receive both services. The conventional RF selectivity at the front-end is replaced with a shared down-conversion circuit, eliminating expensive filter components. This can induce unwanted IMD, or other spectral leakage—which cannot be filtered out from the down-converted signals, because it is in-band in the frequency-band of interest. Instead, the present receiver can solve this problem by switching to the interfering service (which will usually have the stronger signal, in order to create the interference) and receiving the same radio programme on that service instead. By accepting spectral leakage from one frequency band into the other, the receiver can also be designed to consume less power, because the linearity and frequency requirements can be relaxed. This means that more power-efficient (but, for example, less linear) components and circuits can be chosen.

When mutual interference is not occurring, the receiver is able to receive the entire superset of programmes broadcast by both services, such that any programme that is broadcast on either service can be received.

The two different services will typically be broadcast from different sets of transmitters. Therefore, the relative strengths of the signals and level of interference due to spectral leakage will vary geographically. Embodiments of the invention exploit the diversity of transmitters and the overlap in radio programmes transmitted on the different services to improve reception while also simplifying the construction of the receiver.

Each frequency band may comprise a first segment reserved for a signal broadcast by a satellite and a second segment reserved for a signal broadcast by a terrestrial repeater.

The second segment of the second frequency band, used by a terrestrial repeater of the second radio service, may create IMD or other spectral leakage in the first segment of the first frequency band, used by a satellite of the first radio service.

Satellite signals are always transmitted at a power level marginally above the minimum at which reception is possible, in order to conserve energy at the satellite. The signal received from the terrestrial repeater will therefore typically be substantially stronger than that received from the satellite transmitter. Therefore, it is more likely that inter-modulation products arising from the terrestrial signal will be strong enough to interfere with reception of the satellite signal (even if they are relatively modest in amplitude, compared with the desired terrestrial signal itself). In the SDARS system in the USA, the terrestrial repeaters use OFDM, so that the transmitted signal consists of a plurality of sub-carriers at different frequencies. When these sub-carriers encounter non-linear processing at the receiver, they can generate frequency products of the form a*f1+b*f2+c*f3+ . . . where a, b, and c are positive or negative integers and f1, f2, and f3 are the frequencies of the sub-carriers.

The frequency bands of the two radio services may be adjacent in frequency.

The receiver may further comprise an RF band-pass filter, having a pass-band consisting of the two adjacent frequency bands. The RF filter may have a pass-band bandwidth of 25 MHz.

The first frequency band is preferably 2320 MHz to 2332.5 MHz; and the second frequency band is preferably 2332.5 MHz to 2345 MHz.

The first radio service may be the Sirius Satellite Radio service and the second radio service may be the XM Satellite Radio service.

The present receiver may be particularly beneficial in the context of the Sirius-XM system, where there is a very high degree of overlap between the programme-content of the two services.

The shared mixer circuit may be configured to down-convert the signals to an intermediate frequency, IF, signal.

This receiver has a super-heterodyne architecture.

In this case, each of the first and second processing circuits may comprise: a Surface Acoustic Wave, SAW, filtering device, coupled to the output of the mixer circuit, for filtering the IF signal; a down-conversion or mixing stage, coupled to the output of the SAW device; and a poly-phase filter, coupled to the output of the down-conversion stage, for generating a filtered base-band signal.

Each SAW device preferably has a pass-band bandwidth of 12.5 MHz.

The shared mixer circuit may be configured to down-convert the signals directly to the base-band.

This is a direct-conversion receiver, in which the "Intermediate Frequency" is zero.

The receiver preferably further comprises: a decoder, selectively connectable to the output of the first processing circuit or the second processing circuit and operable to decode the at least one radio programme, wherein when spectral leakage in the first frequency band, caused by the second radio service, interferes with demodulation of the first radio service by the first processing circuit, the control circuit connects the decoder to the output of the second processing circuit, whereby the at least one radio programme can be decoded from the second radio service.

Here, there is a single decoder, for decoding the digital radio signal, which decoder is shared (switched) between the two processing circuits.

Alternatively, each of the first and second processing circuits may comprise a decoder, operable to decode the at least one radio programme.

Here, each of the two processing chains comprises its own decoder, so that—for example—decoding of both services can be performed in parallel.

The control circuit may comprise a synchronisation circuit, for synchronising an audio signal of the at least one radio programme broadcast on the first service with an audio signal of the at least one radio programme broadcast on the second service, at the receiver.

The control circuit may also comprise a memory for buffering one of: the audio signal of the at least one radio programme broadcast on the first service; or the audio signal of the at least one radio programme broadcast on the second service, in order to align the two audio signals.

Also provided is a method of receiving a radio programme being broadcast substantially simultaneously on two satellite digital radio services, the digital radio services being broadcast in first and second respective different radio frequency bands, wherein spectral leakage from one of the frequency bands can produce unwanted frequency components in the other frequency band, the method comprising:

mixing a received signal with a locally-generated carrier signal, to down-convert signals in a bandwidth comprising both of the frequency bands to signals of lower frequency;

demodulating the first radio service from the lower frequency signals;

demodulating the second radio service from the lower frequency signals; and selectively providing the demodulated first radio service or the demodulated second radio service to an output, wherein when spectral leakage into the first frequency band, caused by the second radio service, interferes with demodulation of the first radio service, the demodulated second radio service is coupled to the output, whereby the at least one radio programme can be received from the second radio service.

FIG. 1 illustrates the frequency spectrum that has been allocated for SDARS in the USA. SDARS uses frequencies in the region of 2.3 GHz. The allocated bandwidth consists of two adjacent bands of 12.5 MHz bandwidth. The first band is used by Sirius and is in the range 2320 MHz to 2332.5 MHz. This band is sub-divided into two 4510 KHz satellite bands: the first centred at 2322.293 MHz and the second centred at 2330.207 MHz. In between these satellite bands is a terrestrial repeater band, of 4012 KHz bandwidth and centred at 2326.25 MHz. The second SDARS band is used by XM Radio and extends from 2332.5 MHz to 2345 MHz. XM Radio transmits two ensembles of radio programmes in pairs of adjacent bands. This results in the following spectral structure. A first satellite, SAT1 transmits the one ensemble SAT1A in a band 1886 KHz wide centred at 2333.465 MHz; and the other ensemble SAT1B in a 1886 KHz band centred at 2344.045 MHz. A second satellite SAT2 transmits the first ensemble SAT2A in a band 1886 KHz wide, centred on 2335.305 MHz, and the second ensemble SAT2B in a band 1886 KHz wide, centred at 2342.205 MHz. Once again, a terrestrial repeater is allocated the bandwidth between the satellite bands. The first terrestrial repeater ensemble TERRA is transmitted in a band centred at 2337.490 MHz and 2510 KHz wide; the second ensemble is repeated terrestrially in the neighbouring band, centred on 2340.020 MHz and having the same bandwidth.

In both cases, the satellites use Quadrature Phase-Shift Keying (QPSK) modulation. The signals arriving at the receiver have a very low signal amplitude while in the centre a potentially very strong terrestrial repeater signal is located. This signal is Orthogonal Frequency Division Multiplexing (OFDM) modulated; that is, it consists of a multitude of orthogonal sub-carriers. The dynamic range between the satellite and terrestrial signal can be up to 80 dB.

This complicated, closely-spaced frequency structure means that if a low-power desired satellite signal is received together with a relatively strong terrestrial signal of the other provider, nonlinear transfer characteristics in the receiver will cause the OFDM signal to produce a large number of interfering frequency products spreading around the unwanted terrestrial signal. These inter-modulation products (especially second and third order products) can then jam the weaker satellite signal, thus preventing reception.

Figure 2:
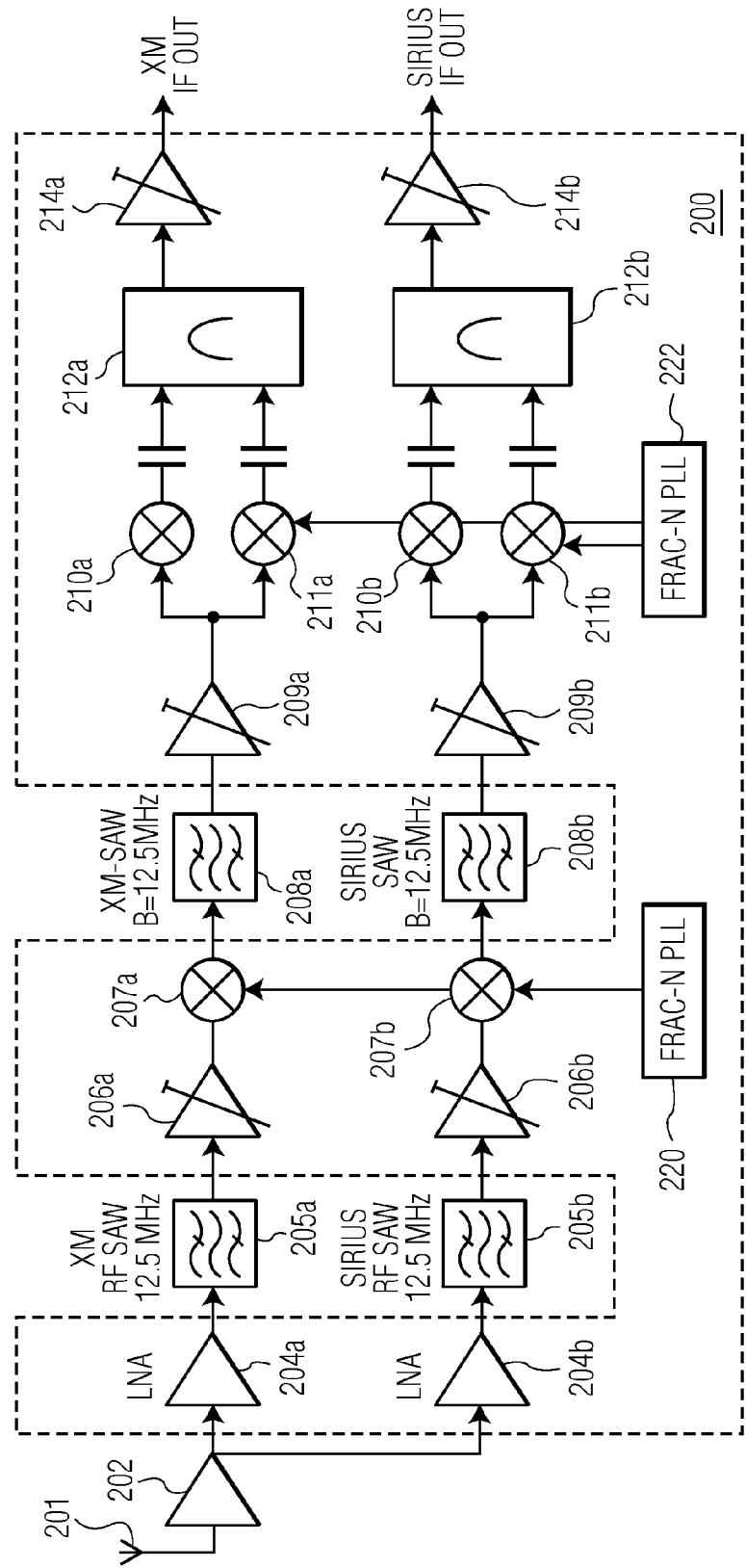
FIG. 2 illustrates a hypothetical combined receiver for the two services, based on the conventional approach of RF selectivity.

In a receiver designed to receive programmes from just one of the two services, this problem is tackled conventionally by the addition of RF selectivity. FIG. 2 shows a receiver which applies a similar solution in a receiver that is capable of receiving both 12.5 MHz bands simultaneously. Additional RF selectivity protects each RF reception path by means of a Surface Acoustic Wave (SAW) filter. Such an arrangement needs additional board space, is power hungry due to the needed additional high-dynamic range amplifiers (LNAs) to compensate for the associated filter losses and is also costly.

The receiver of FIG. 2 amounts to a co-location of an XM Radio receiver (elements labelled with the suffix "a" in the diagram) with a Sirius receiver (elements labelled "b"). Only the antenna 201; antenna amplifier 202 and Fractional-N Phase-Locked Loops (PLLs) 220, 222 are shared between the two receivers.

Each separate receive path comprises a Low-Noise Amplifier 204 followed by an RF SAW filter 205. The output of the RF SAW filter is input to a variable gain amplifier 206, which can be used to form an Adaptive Gain Control (AGC). Next, the signal is down-converted to an Intermediate Frequency (IF) by mixing with a Local Oscillator (LO) signal output by a first Fractional-N (PLL) 220. The IF signal is filtered by an IF SAW filter 208, to remove unwanted products of the mixing process. After a further variable-gain amplifier stage 209, the IF signal is passed to a complex mixer, implemented as two mixers 210 and 211, driven by a second Fractional-N PLL 222. This is followed by a poly-phase filter-bank 212 and a further variable gain element 214. The output of the poly-phase filter 212 is passed to a suitable base-band processor. The design of a single branch of the receiver of FIG. 2 is already known to those skilled in the art, since each branch is a conventional Sirius or XM radio receiver, respectively. Likewise, the design of the base-band processing parts (not shown) will be within the capabilities of the skilled person. The complex mixer 210, 211 may convert the IF signal to a low-IF signal or a zero-IF signal. Note that references to "IF", such as the outputs labelled "IF out" in FIGS. 2 and 3 include the possibility of an intermediate frequency of zero—that is, a baseband signal.

Instead of protecting the individual reception path for each of the two operator signals with additional, expensive, selective filtering (as shown in FIG. 2), the present invention uses a different approach. The embodiment in accordance with the invention utilizes, that the programme content of the XM and Sirius services is almost identical. This enables diversity arrangements which use the signal of the other provider when critical conditions for the originally tuned signal occur. At the same time, the receiver is able to ensure simultaneous reception of both frequency bands under benign circumstances, which means that customers can pay for the additional feature of receiving the superset of the radio programmes of both services.

Figure 3:
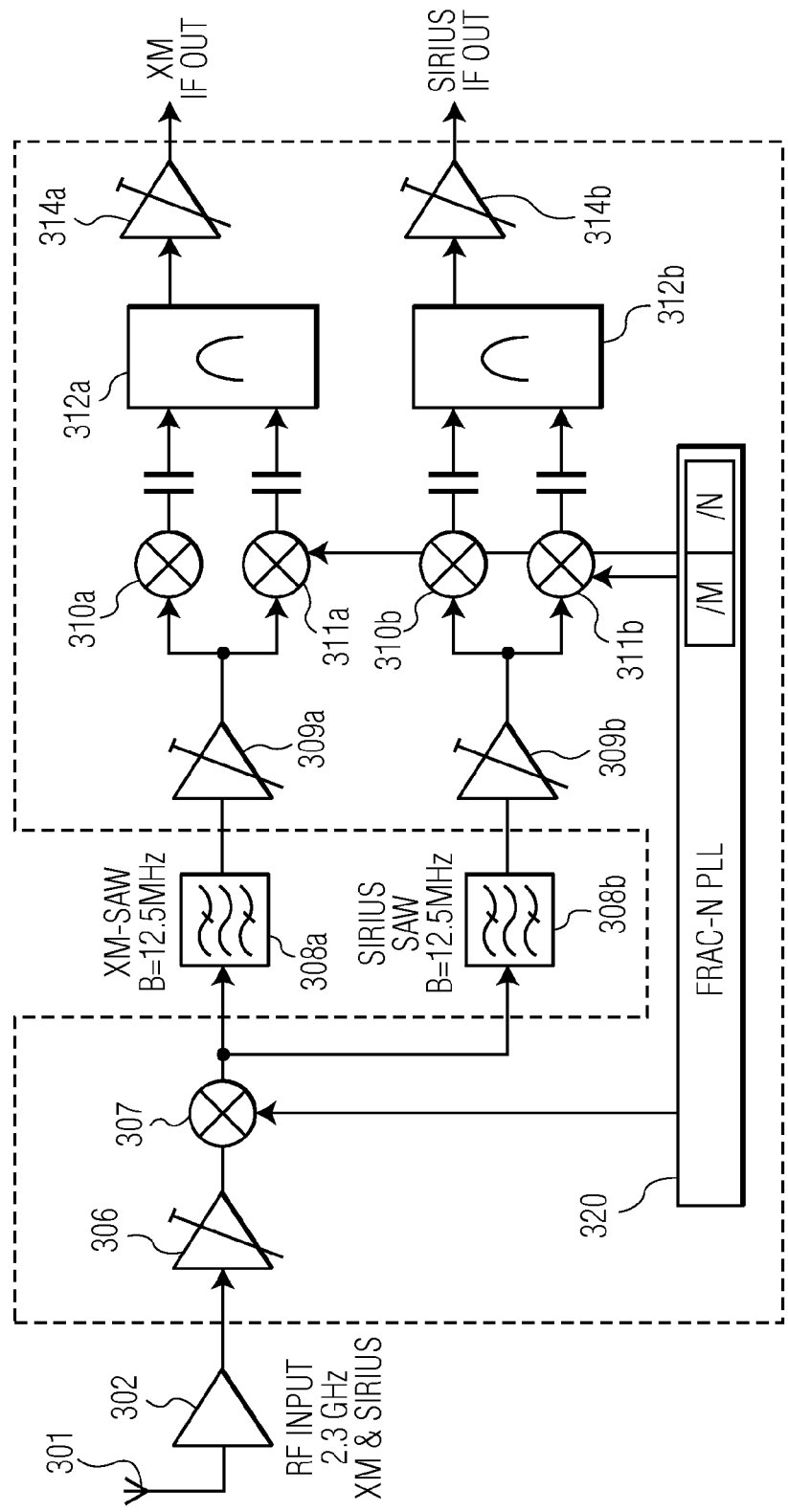
FIG. 3 is a block diagram of a dual-path tuner according to an embodiment of the invention.

A receiver making use of these observations is shown in FIG. 3. It comprises a common RF reception path for both satellite radio signals. An active antenna arrangement at the front-end comprises an antenna 301 and amplifier 302. From the active antenna, the received RF signal is input to a variable gain amplifier 306 which is an AGC. The output of this amplifier 306 is input to a first shared down-conversion stage 307 that feeds two separating IF SAW filters 308a 308b, to divide the incoming signal into two 12.5 MHz bands. The shared mixer 307 mixes the incoming RF signal with a local oscillator signal generated by a Fractional-N PLL 320, to down-convert to IF. More specifically, after down-conversion, one of the services will appear centred at +7.5 MHz, while the other will appear at −7.5 MHz. In this embodiment, no RF filter is provided upstream of the shared mixer 307 in the receiver chain.

As before, components in the XM radio receive path are labelled with the suffix "a" and those in the Sirius path are labelled "b". In each subsequent IF path, there is a variable gain element 309, followed by a second down-conversion stage 310, 311, which is a quadrature mixer of the same kind used in the design of FIG. 2. The same Fractional-N PLL 320 also produces the local oscillator signals to drive the complex mixer 310, 311. The LO signal for the second, complex mixer 310, 311 can be generated by a fixed divider in each case, instead of requiring a full PLL. This additional PLL would cost much more area and could potentially produce significant interference with other LO signals. Moreover, since the spectra of the XM service and the Sirius service are centred at symmetric points around the zero frequency, both paths can use a similar IF filter, thus reducing design effort.

The signals are then individually fed to integrated poly-phase filters 312, further removing unwanted signal content and finally to variable gain amplifiers 314, before output to a suitable baseband processing device (not shown in FIG. 3). In the present, preferred embodiment, there are two baseband devices, one for each of the two outputs shown in FIG. 3.

The dashed line in FIG. 3 shows the group of components that can conveniently be implemented in a monolithic semiconductor device. The SAW filters are implemented separately, off-chip. The Fractional-N PLL 320 may also have an off-chip reference oscillator, such as a temperature-compensated crystal.

This arrangement allows the receiver to simultaneously receive both services if so desired. There is no need to switch between the two paths and wait for the baseband device to process the signal before producing audio information. This processing would typically take several seconds, so that the listener would experience a "break" in transmission. The receiver is also able to receive, for example, audio from one of the services while from the other service traffic or stock exchange background data is loaded (from a data channel of the other radio service).

In critical signal conditions, when reception of a satellite signal of one provider is blocked by the IMD mechanism explained above, the other receive-path for the other service (that is, the one causing the interference) can take over, so that reception continues without interruption. This might occur not only in situations as described before, but also in various other conditions when a signal is lost, for example due to the loss of satellite signal in circumstances where no terrestrial repeater of the same provider is available. It is then always possible to use the other system's satellite or terrestrial signal.

If seamless transition from one provider's signal to the other is desired, the transmitted signals should be synchronized adequately (between the two service providers' broadcasts)—for example, by providing time stamps embedded in the transmitted signals. Some memory might be needed in the receiver to buffer data from the other signal until it is used. Currently, synchronisation is provided by the operator, using GPS based time references. A conventional receiver designed for use with one of the two services (Sirius/XM) comprises a memory large enough to make interleaving possible between different satellite signals (or a terrestrial and a satellite signal) of that service provider. Delay between satellites of the same system is currently of the order of 4 seconds, so the receiver has a buffer large enough to accommodate this. As will be apparent to those skilled in the art, similar techniques can be used to synchronise signals between the different service providers. If the relative delay between the two operators streams is fixed (constant) over time, then the synchronisation method may be made simpler.

Figure 4:
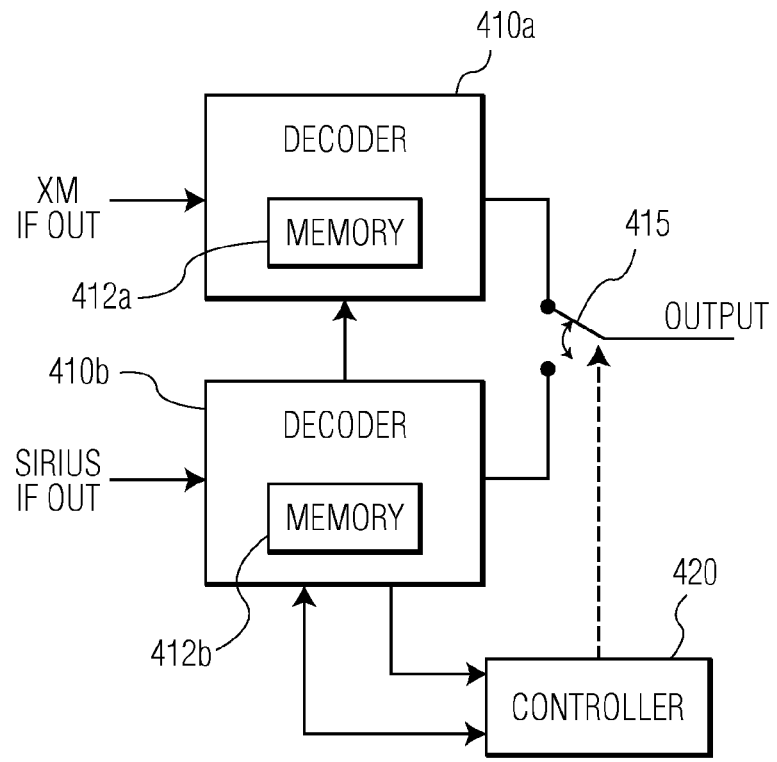
FIG. 4 is a block diagram of a base-band processor, for the tuner of FIG. 3.

FIG. 4 shows a block diagram of the base-band processor used with the receiver of FIG. 3. This comprises a first decoder 410a for the first radio service received in the first frequency band and a second decoder 410b for the second radio service received in the second frequency band. Each decoder digitises (using an analogue to digital converter) and decodes both the satellite and terrestrial transmissions for the respective radio service (XM or Sirius). A controller 420 monitors the two decoders 410a, 410b and determines which stream will be output from the receiver. This is achieved by controlling a switch 415 which selectively couples one decoder or the other to the output. The decoded data (such as digital audio data) decoded by each decoder 410a, 410b is buffered in a respective memory 412a, 412b. The controller coordinates the two decoders so that the output from these two buffer memories 412a, 412b is synchronised. This can be done by the same methods used in a conventional SDARS receiver to synchronise the terrestrial transmission with the satellite transmission of a single service provider, or to handover between two different satellites of the same service provider.

The choice of which stream to play at the output may be made in a variety of ways. In this embodiment, the controller monitors bit errors and decides which stream to output by detecting an increase in bit errors compared with the signals received from the other radio service. As an alternative to simple switching, all transmitted signal content can be combined into a "best possible" signal, by maximum-ratio combining (majority decisions). That is, when there are two baseband devices, it is possible to blend the two signals together.

Figure 5:
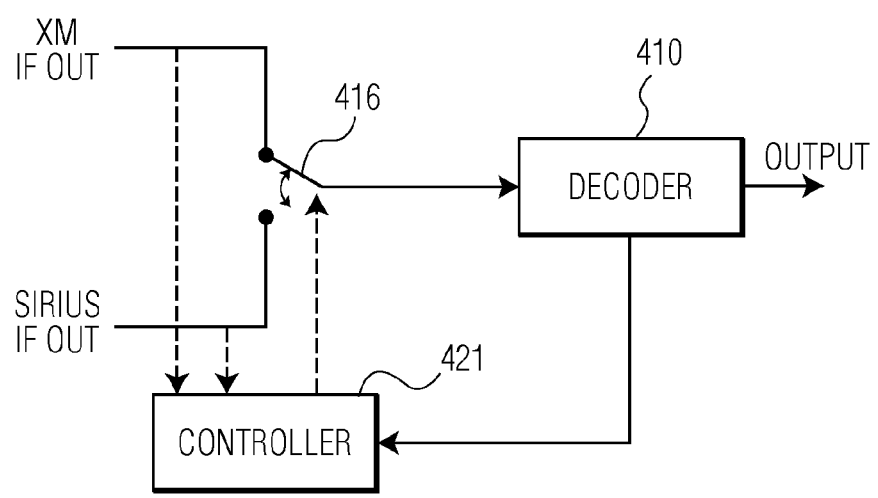
FIG. 5 is a block diagram of an alternative base-band processor.

FIG. 5 shows an alternative baseband processor architecture. This comprises a single decoder 410. The IF outputs of the XM and Sirius processing-paths, respectively, are selectively connected to the input of this decoder 410, by means of a switch 416. The selection switch 416 is controlled by a controller 421. The controller 421 decides which signal to couple to the decoder based on measurements made by a level detector. The level detector tests the signals input to the baseband device and can detect if there are suitable signals (preferably from a terrestrial transmitter) in the other band. When this condition is detected, the selection switch 416 is changed over, to couple the signals received from the other radio service to the decoder 410.

With the architecture of FIG. 5, there may be gaps in reception when switching between a programme broadcast on the first radio service and the same programme being broadcast on the second radio service. This is because the two streams are no longer being decoded in parallel, so there may be an initial delay, after switching, while the single decoder 410 acquires and processes a sufficient length of the new signal, after switching. Nevertheless, the user may be prepared to accept these minor interruptions for the sake of a cheaper receiver architecture—particularly when the alternative may be to completely lose reception of the radio programme (as would be the case for a conventional, single-service receiver).

The particular receiver architecture of FIG. 3 has the advantage that the two IF signal paths using a suitable frequency plan can be made almost identical, thus saving design effort. However, for those familiar with receiver architectures, it will be apparent that similar functionality could also be realised using other receiver architectures, such as for example of the Zero-IF type or others, albeit with greater design effort.

Figure 6:
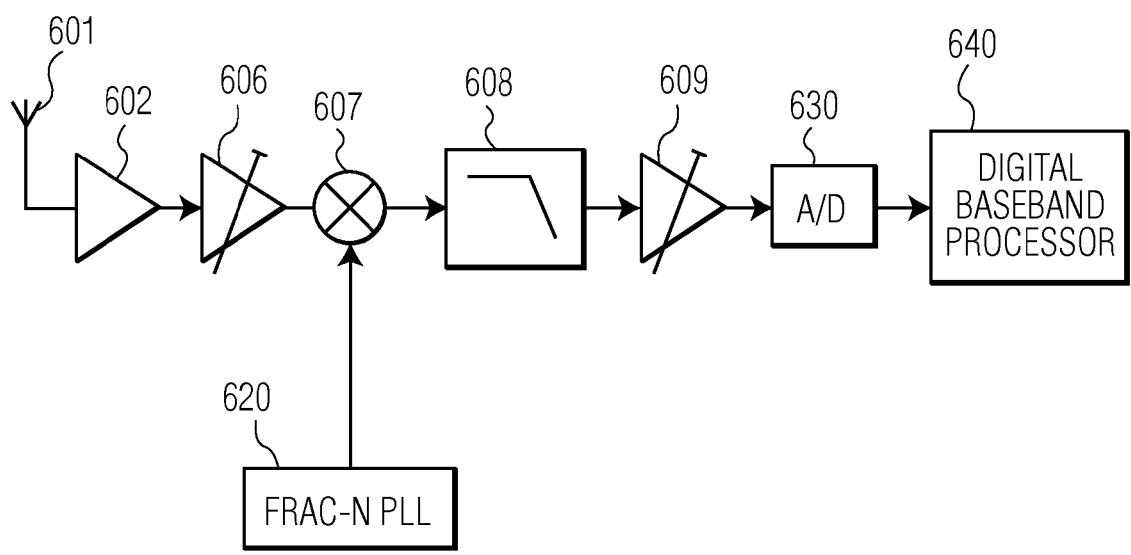
FIG. 6 is a block diagram of a dual radio-service tuner according to another embodiment of the invention.

An embodiment using a zero-IF receiver is illustrated in FIG. 6. Here, the transmitted signals from the two radio services are received on antenna 601 and amplified in amplifier 602 (which can be combined with the antenna 601 to form an active antenna). Variable gain control 606 further amplifies the received signals (or attenuates them, if necessary). There is a single analogue down-conversion stage, using mixer 607. Here, the whole 25 MHz bandwidth of the received signal is mixed with a local oscillator signal generated by a Fractional-N PLL 620. Up to this point in the receive-path, the circuit is similar to that of FIG. 3. However, the down-conversion in the mixer 607 is directly to base-band; that is, the intermediate frequency (IF) is zero. The base-band signal is low-pass filtered in filter 608 and its amplitude is then adjusted by an AGC 609, before the signal is sampled (converted to digital form) in analogue to digital converter 630. The digital signal is output to a digital base-band processor 640, where the signals of the two radio services are separated in the digital domain with digital baseband processing.

The invention permits the requirements for the individual reception paths to be relaxed, because the architecture no longer has to fully take into account the otherwise most critical condition of receiving a weak satellite signal in presence of a strong terrestrial interferer. It allows simultaneous reception of XM and Sirius services, without the temporary signal loss that would occur, for example, in a receiver having a single path that is switched from one system to the other. The present solution avoids the use of costly, power- and silicon-area intensive additional RF filters which reduces the overall bill of materials. Signal coverage is enhanced, especially in critical receiving conditions of all possible natures.

While the invention has been illustrated and described in detail in the drawings and foregoing description, such illustration and description are to be considered illustrative or exemplary and not restrictive; the invention is not limited to the disclosed embodiments.

For example, while the embodiments described above have been directed to the specific case of Sirius and XM Radio in the USA, the methods and apparatus of the invention are also applicable to other satellite radio services. In general, they are applicable where service providers operate in parallel with an overlap of at least one programme (that is, radio station) among their different services.

Various parts of the receiver may be software-defined, wherein a general purpose processor is adapted to implement the invention by programming it to execute a suitable computer program, the processor thereby performing a method according to an embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A satellite digital radio receiver for receiving first and second radio services, broadcast in first and second respective different radio frequency bands,
    wherein at least one radio programme is broadcast substantially simultaneously on both radio services, and
    wherein one of the frequency bands can produce interference in the other frequency band,
    the receiver comprising:
    a shared mixer circuit, configured to receive and down-convert signals in a bandwidth comprising both of the frequency bands to signals of lower frequency;
    a first processing circuit, coupled to the output of the mixer circuit and configured to demodulate the first radio service;
    a second processing circuit, coupled to the output of the mixer circuit and configured to demodulate the second radio service; and
    a control circuit, connected to the first and second processing circuit and adapted to selectively couple the output of either the first or the second processing circuit to an output of the receiver,
    wherein when interference in the first frequency band, caused by the second radio service, interferes with demodulation of the first radio service by the first processing circuit, the control circuit couples the output of the second processing circuit to the output, whereby the at least one radio programme can be received from the second radio service.

2. The receiver of claim 1, wherein each frequency band comprises a first portion reserved for a signal broadcast by a satellite and a second portion reserved for a signal broadcast by a terrestrial repeater.

3. The receiver of claim 2, wherein the second portion of the second frequency band, used by a terrestrial repeater of the second radio service, creates interference in the first portion of the first frequency band, used by a satellite of the first radio service.

4. The receiver of claim 1, wherein the frequency bands are adjacent in frequency.

5. The receiver of claim 4, wherein:
    the first frequency band is about 2320 MHz to about 2332.5 MHz; and
    the second frequency band is about 2332.5 MHz to about 2345 MHz.

6. The receiver of claim 1, wherein the first radio service is the Sirius Satellite Radio service and the second radio service is the XM Satellite Radio service.

7. The receiver of claim 1, wherein the shared mixer circuit is configured to down-convert the signals to an intermediate frequency, IF, signal.

8. The receiver of claim 7, wherein each of the first and second processing circuits comprises:
    a Surface Acoustic Wave, SAW, device, coupled to the output of the mixer circuit, for filtering the IF signal;
    a down-conversion stage, coupled to the output of the SAW device; and
    a poly-phase filter, coupled to the output of the down-conversion stage, for generating a filtered base-band signal.

9. The receiver of claim 8, wherein each SAW device has a pass-band bandwidth of 12.5 MHz.

10. The receiver of claim 1, wherein the shared mixer circuit is configured to down-convert the signals directly to the base-band.

11. The receiver of claim 1, further comprising:
    a decoder, selectively connectable to the output of the first processing circuit or the second processing circuit and operable to decode the at least one radio programme,
    wherein when interference in the first frequency band, caused by the second radio service, interferes with demodulation of the first radio service by the first processing circuit, the control circuit connects the decoder to the output of the second processing circuit, whereby the at least one radio programme can be decoded from the second radio service.

12. The receiver of claim 1, wherein each of the first and second processing circuits comprises a decoder, operable to decode the at least one radio programme.

13. The receiver of claim 1, wherein the control circuit comprises a synchronisation circuit, for aligning the audio signal of the at least one radio programme broadcast on the first service with the audio signal of the at least one radio programme broadcast on the second service.

14. The receiver of claim 13, wherein the control circuit comprises a memory for buffering one of the audio signals, in order to align it with the other audio signal.

15. A method of receiving a radio programme being broadcast substantially simultaneously on two satellite digital radio services, the digital radio services being broadcast in first and second respective different radio frequency bands,
    wherein one of the frequency bands can produce interference in the other frequency band, the method comprising:

mixing a received signal with a locally-generated carrier signal, to down-convert signals in a bandwidth comprising both of the frequency bands to signals of lower frequency;

demodulating the first radio service from the lower frequency signals;

demodulating the second radio service from the lower frequency signals; and selectively providing the demodulated first radio service or the demodulated second radio service to an output, wherein when interference in the first frequency band, caused by the second radio service, interferes with demodulation of the first radio service, the demodulated second radio service is coupled to the output, whereby the at least one radio programme can be received from the second radio service.

* * * * *